United States Patent [19]
Jones

[11] 3,815,874
[45] June 11, 1974

[54] BOLT TENSIONING DEVICE ESPECIALLY ADAPTED FOR USE WITH NUCLEAR REACTOR PRESSURE VESSEL

[75] Inventor: Cecil R. Jones, Hamden, Conn.

[73] Assignee: Transfer Systems Incorporated, New Haven, Conn.

[22] Filed: Oct. 18, 1971

[21] Appl. No.: 190,097

[52] U.S. Cl. .......................................... 254/29 A
[51] Int. Cl. ............................................ E21b 19/00
[58] Field of Search ............ 81/57.38, 54; 254/29 A

[56] References Cited
UNITED STATES PATENTS

| | | | |
|---|---|---|---|
| 2,760,393 | 8/1956 | Stough | 81/57.38 |
| 2,866,370 | 12/1958 | Biach | 81/57.38 |
| 3,077,335 | 2/1963 | Singleton | 254/29 A |
| 3,099,075 | 7/1963 | McDaniels et al. | 29/252 |
| 3,099,434 | 7/1963 | DeMart | 254/29 A |
| 3,128,990 | 4/1964 | Brooks et al. | 81/57.38 |
| 3,230,799 | 1/1966 | Maciulaitis | 81/57.38 |

Primary Examiner—James L. Jones, Jr.

[57] ABSTRACT

An improved bolt tensioning device for use for loosening or tightening the bolts which secure the pressure head to a nuclear reactor pressure vessel is described. The improved tensioner comprises a head bearing member which surrounds the bolt nut and has an annular ledge defining with an overlying complementary mating piston member an annular pressurized fluid receiving chamber. A connection to the bolt stud is constituted by a split sleeve or ring which is placed in threaded engagement with the stud above the fluid receiving chamber and held in place therein by a surrounding retainer sleeve via matching tapered surfaces. A bearing washer with curved bearing surface is interposed between the upwardly urged complementary member and the split ring for transmitting the upward force to the latter and via the latter to the stud.

12 Claims, 4 Drawing Figures

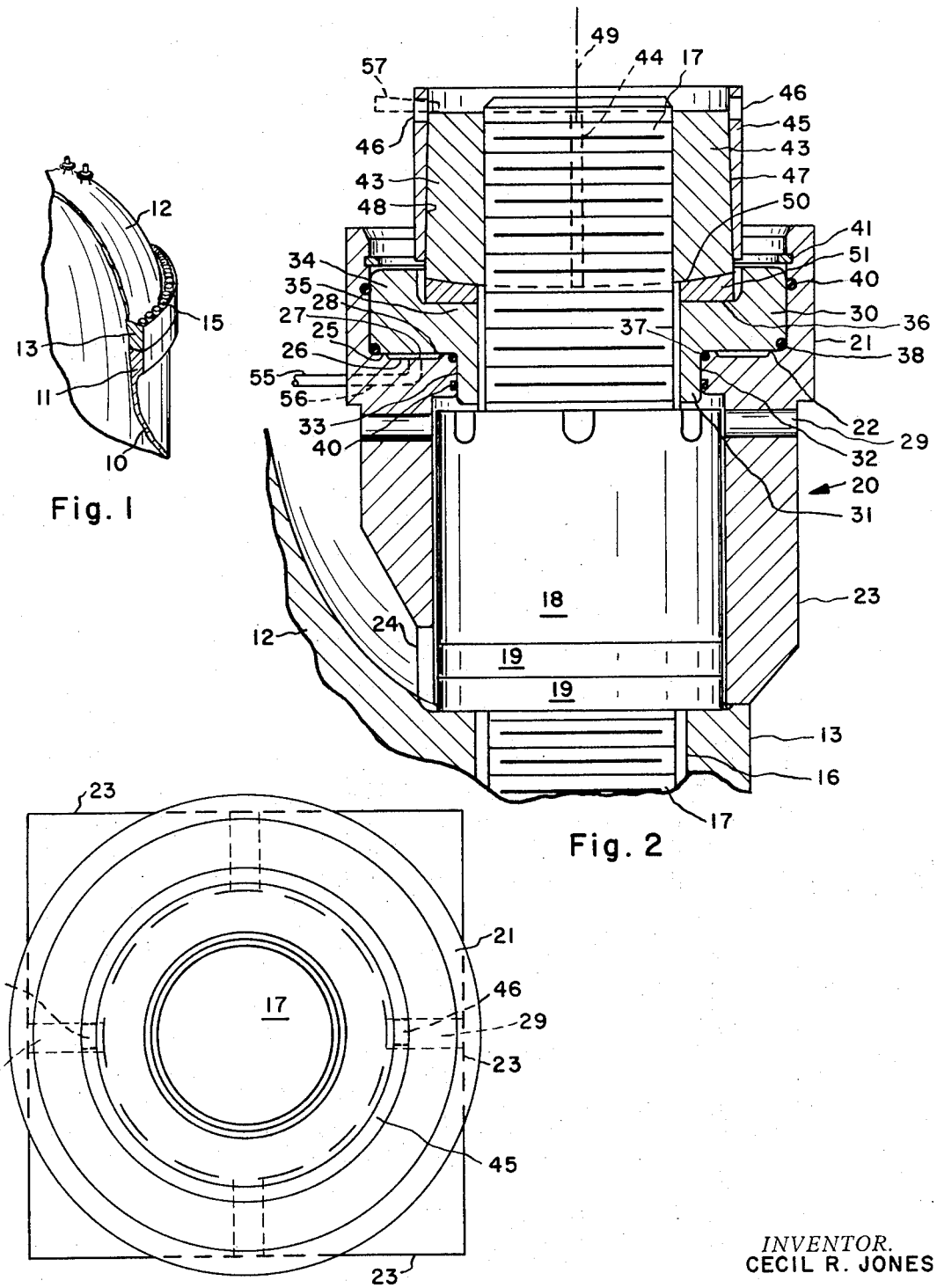

BOLT TENSIONING DEVICE ESPECIALLY ADAPTED FOR USE WITH NUCLEAR REACTOR PRESSURE VESSEL

This invention relates to a bolt tensioning device adapted for use for tightening or loosening the nuts which bolt the head to the pressure vessel of a nuclear reactor for power generation.

In my prior copending application, Ser. No. 148,617, filed June 1, 1971, I describe and claim one form of bolt tensioning device for such an application, which comprises a force transmitting member axially split into two annular segments having an internal lower helical thread adapted to engage the threaded end of the bolt stud above the locking nut, and having internally at its upper end non-pitched square grooves adapted to engage similar projections of a puller rod supported above the stud and bearing against the head flange. The force transmitting member is recessed at its center to accommodate a pair of cylindrical retainer rings. The outer dimensions of the force transmitting member are chosen such that, when the split segments are moved into engagement with the threads of the stud and the projections on the puller rod, then the upper retainer ring can be moved upwardly and the lower ring downwardly over the larger diameter portions of the force transmitting member locking it to the stud and the puller rod. Hydraulic means are provided to apply a displacing force between upper and lower portions of the puller rod support causing the stud end held by the force transmitting member to be lifted upwardly a desired amount.

The present invention provides an improved form of bolt tensioner over that described in said copending application, offering the advantages of smaller size and weight, and easier assembly and disassembly from the bolt to be tensioned.

My improved tensioner eliminates the complex force transmitting member having helical threads and non-pitched grooves at opposite ends, and uses instead a simple split internally threaded ring which can be caused to engage the threaded end of the stud extending above the locking nut. The outside surface of the split ring is tapered such that the wider end is located at the bottom. The split ring after engagement with the stud is locked into position by a solid sleeve which has a bore with an internal surface tapered to match that of the split ring but with its wider dimension located on top. The flange bearing member instead of extending over the stud top as in my prior construction, now comprises a generally annular member having an inwardly extending annular ledge whose upper surface defines with the lower opposing surface of a complementary member an annular fluid receiving chamber extending below the split ring. Means are provided to couple the complementary member to the underside of the split ring such that, when pressurized fluid is introduced into the fluid receiving chamber, the complementary member is urged upward relative to the flange bearing member, and that upward force is transmitted directly to the underside of the split ring urging it and the stud to which it is locked upward relative to the head flange. In accordance with another feature, means are provided for hydraulically assembling the tensioner, and for preventing overtravel of the complementary member during a tensioning operation.

My improved tensioner is approximately half the size or less of that described in my copending application. Moreover, it is easier to assemble and disassemble from the bolt, thereby offering the further advantage of reducing the time required to effect head tightening and loosening of the reactor vessel.

My invention will now be described in greater detail in connection with several exemplary embodiments thereof, reference being had to the accompanying drawing wherein:

FIG. 1 is a partial cut-away view of the upper end of the pressure vessel of a power generating nuclear reactor;

FIG. 2 is a cross-sectional view through the center of one embodiment of the bolt tensioner of the present invention in place surrounding one bolt extending through the head flange;

FIG. 3 is a top plan view of the construction shown in FIG. 2;

Figure 4:
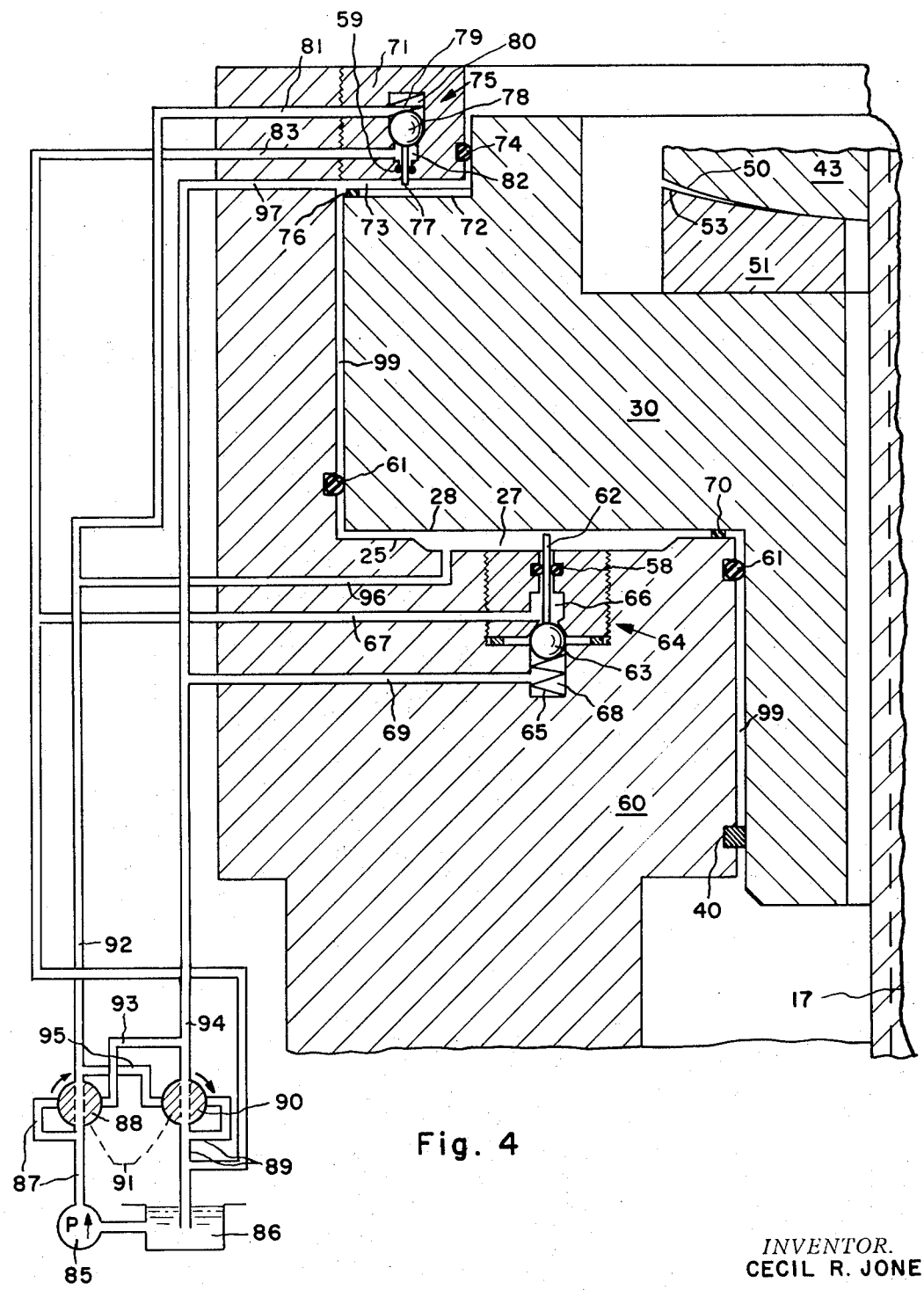
FIG. 4 is a partial cross-section of a second embodiment.

FIG. 1 illustrates an upper corner cut-away in front of a typical pressure vessel for a power generating nuclear reactor. It consists, simply, of an elongated hollow cylindrical pressure vessel 10 terminating on top in an annular flange 11. Seated on the flange 11 is the vessel head 12, comprising a dome shaped member terminating at its bottom also in an annular flange 13. The two flanges 11, 13 are bolted together by a circular array of bolts 15. Generally this is accomplished by drilling holes in the lower flange 11, tapping the holes, providing a threaded insert in the holes, threading a threaded stud into the insert thus locking the stud to the lower flange, providing a clearance hole in the upper flange 13 through which the stud passes, and threading one or more washers and finally a locking nut on the protruding stud end and tightening the nut. Generally, O-ring seals are provided between the flanges to seal the vessel interior. As explained in my copending application, in view of the high pressures involved, the studs must be pre-tensioned. More precisely, each stud is elongated, ie., stretched, to a tension exceeding that which will be exerted on the stud by the vessel pressure, to prevent lifting of the head, breaking of the seal, and escape of contaminated water or steam from the reactor vessel.

To indicate some idea of the nature of the problem involved, one typical pressure vessel for a boiling water reactor (BWR) operates at a pressure of about 1,000 psi, and employs 92 bolts to secure the head of the pressure vessel. Each bolt stud is approximately 6 inches in diameter, extends approximately 18 inches above the head flange, and utilizes a nut with a diameter of about 10 inches and a height of about 7 inches. To tighten a nut of this size to pre-tension the stud to the required degree requires the following procedure. With the nut in place on the stud, the stud is pulled upward by a tensioner until a desired degree of elongation is achieved, for example, about 0.125 inches. Then, while so held, the nut is tightened down against the flange and the stud released. A similar procedure is employed to loosen the nut, namely, pulling up of the stud end until the nut is lifted clear of the flange, and then the nut may be freely rotated upward before the stud is released. Removal of the head in the above example thus requires that each of the 92 studs be lifted upwardly by a tensioner to free the nut, and then released.

The speed with which this can be accomplished reduces the downtime of the reactor and its operating cost. The invention of this case features a tensioner that is smaller and of lighter weight. Thus, it is easier to handle and requires less time and effort to move from bolt to bolt. Further, the tensioner is easier to assemble and dissemble from a bolt further reducing the time required for this tensioning operation.

One embodiment of the inventive tensioner is illustrated in cross-section in FIG. 2 and in plan view from the top in FIG. 3, in assembled position for a tensioning operation on an individual bolt. In this FIGURE, the head dome is shown at 12, the head flange at 13, the clearance hole for the stud at 16, the stud at 17, the locking nut at 18 and a pair of washers 19 between the nut 18 and the flange 13. The vessel flange 11 is not shown, but the bottom end of the stud 17 also not shown would be secured or anchored therein.

The bolt tensioner comprises a flange bearing member 20 comprising a generally annular structure which surrounds the nut and stud and comprising a cylindrical body 21 having an inwardly extending annular ledge 22 and from which a rectangular skirt portion 23 depends and which bears against the top surface of the flange 13. The skirt portion 23 is cut away locally 29 in sufficient places to provide access for a wrench to rotate the nut 18 during the tightening or loosening operation, and is scalloped or cut away (not shown) to provide clearance for adjacent nuts 15, and is also cut-away as shown at 24 to provide clearance for the head dome 12. The bearing member 20 supports the remaining tensioner parts prior to the application of pressure.

The annular ledge 22 has on its top surface 25 an annular depression 26 forming the bottom wall of a fluid receiving chamber 27. The top wall of the chamber 27 is formed by the opposed bottom annular surface 28 of an annular complementary piston member 30 which rests on the ledge 22.

The complementary member 30 comprises a skirt portion 31 whose outer surface 32 mates with the facing inner surface 33 of the ledge 22 and a main upwardly extending body portion 34 also forming an inwardly extending ledge 35 forming a bearing surface 36 which is horizontal and parallel to the ledge surface 25.

High pressure fluid seals are provided at the mating surfaces 25, 28 defining the chamber 27. As shown, these are inner and outer annular grooves, the inner one 37 at the corner of the surface 25, and the outer one 38 at the corner of the surface 28, filled with O-rings of known elastomer material. Two further wiper seals 40 are provided along the vertical surfaces between the two mating members to prevent outward leakage of any lubricating oil present therebetween. A retainer ring 41 may be spring seated in an annular groove in the bearing member 22 just over the complementary member 30 to ensure against excessive lifting of the latter.

The tensioner part secured to the stud 17 comprises a sleeve or ring 43 axially divided into two or four equal segments separated by gaps 44 and having an internal helical thread adapted to engage as shown the threaded end of the stud 17. The split ring 43 is secured to the stud by a sleeve retainer 45 comprising a cylindrical sleeve with two wall apertures 46 on top and designed to embrace and urge the ring segments inward into threaded engagement with the stud. This is accomplished by providing a tapered outer surface 47 on the split ring 43, and a similarly tapered inner surface 48 on the retainer 45. A suitable taper is a standard locking taper of about 7°.

The split sleeve 43 has along its bottom edge an annular bearing surface 50 which has a small convex curvature. Between the two bearing surfaces 36, 50 is located an annular washer 51, whose bottom surface 52 is flat to match that of its contacting surface 36, and whose upper surface 53 is concave to engage contacting surface 50.

The fluid introduction means comprises an inlet line 55 whose other end (not shown) is secured to a suitable high pressure hydraulic system comprising the usual pump, oil supply and the like, held in place in conventional manner within a channel 56 formed in the member 22. The channel 56 terminates at the receiving chamber 27.

In operation, the flange bearing member 20 is seated on the flange 13 and over the nut 18 to be loosened or tightened. Then the complementary member 30 is lowered and forced into position until it mates with the member 22 as shown in the drawing. Next, the retaining ring 41 is installed. Thereafter, the bearing washer 51 is lowered onto the shoulder 36. Then the two segments of the split ring 43 are seated on the washer 51 on opposite sides of the stud and manually moved into threaded engagement with the stud 17. Next the tapered retainer 45 is slipped over and gradually worked down to the position shown as the split segments move closer into the stud threads. In this final position shown in FIG. 2, the fluid seals are engaged sealing off in a fluid tight manner the chamber 27.

Now, the hydraulic system may be activated and fluid pumped into the chamber 27. As the fluid pressure builds up, the complementary piston member 30 is urged upward relative to the member 20 which seats on the flange 13. This upward force is transmitted via the washer 51 to the split ring 43, which now pushes the stud top upward. If a nut loosening operation is planned, the pressure is increased until the stretching stud lifts the nut 18 clear of the washers 19, whereupon a suitable wrench can be inserted through hole 29 in skirt portion 23 to rotate the nut upward. For a tightening operation, as described in my copending application, the stud is elongated a desired amount as measured against a fixed point in the apparatus, for example a rod extending through a clearance hole downward through the stud and welded to the vessel flange 11. When the desired elongation or tensioning is obtained, the nut is tightened down and the hydraulic pressure removed releasing the stud. After the desired operation is completed, the fluid is drained off into its supply, and the device disassembled in the reverse manner to its assembly. For this purpose, the holes 46 in the tapered retainer 45 can be used with a suitable leverage applying tool such as a wedge (shown in phantom at 57) to free the retainer 45 from the split ring 43.

As will best be appreciated from a comparison of the structure of the present invention with that of my copending application, the present structure is half the size or less than my previously invented structure. This makes for lighter, more easily handled parts. Further, the present structure is far simpler to assemble, involving as it does the mere piling of the several elements one on top of another, without any possibility of misaligning members, since they can only fit together when properly assembled. Especially engagement of the split ring has been simplified, as it is shorter and only requires engagement with the stud threads. The result is to permit a significant reduction in the time required to loosen or tighten each bolt of the vessel head. In the first embodiment described above, the various elements are manually assembled. FIG. 4 is a partial cross-section of the flange-bearing and complementary piston members of a second modified form of tensioner of the invention providing hydraulic assembly and also overtravel protection. Similar elements bear the same reference numerals as in FIG. 2. The flange-bearing member, designated 60 includes the fluid receiving chamber 27 sealed off by suitable high pressure seals 61. Extending upward into the chamber 27 just above the plane of the surface 25 is a rodlike mechanical depressor 62 connected to the ball 63 of a check valve 64. The ball 63, urged upwardly by a stiff compression spring 65, seals off an upper chamber 66 connected to a conduit 67 from a lower chamber 68 located below the ball and connected to a conduit 69. The upper end of the flange-bearing member 60 forms a shoulder 71 extending over an opposed surface 72 of the complementary member 30 and forming therewith a second fluid receiving chamber 73 located above the complementary member. The second chamber 73 is sealed off by seals 61 and 74. The shoulder 71 houses a similar ball check valve 75 with mechanical depressor 77 but in inverted position. The ball 78, spring loaded 79 on top, forms an upper chamber 80 connected to a conduit 81 and a lower chamber 82, sealed off by the spring biased ball, connected to a conduit 83. The depressor 77 protrudes a short distance into the second chamber 73 such that the spacing to the opposed surface 72 is slightly larger than the required elongation of the stud 17.

A high pressure pump 85 is connected to a reservoir 86. The pump is also connected by conduits 87 to a 3-way valve 88. The reservoir 86 is connected by conduits 89 to a second 3-way valve 90. The two valves are ganged 91 for simultaneous operation. The valve 88 has two outlets, 92 connected to conduit 81 and 93 connected to an outlet 94 of the second valve 90, which also has a second outlet 95 connected to the first valve outlet 92. The reservoir 86 is also directly connected to conduits 67 and 83. The outlet 92 from the first valve 88 is also connected to a conduit 96 connected to the first chamber 27, and the outlet 94 from the second valve is also connected to a conduit 97 connected to the second chamber 73. The lower check valve 64 is used to indicate when the complementary member 30 is seated in proper position during assembly, and the upper check valve 75 is used to prevent overtravel of the complementary member 30 during a bolt tensioning operation. O-ring seal 58 seals rod 62 against pressure differences between chambers 27 and 66, and O-ring seal 59 seals rod 77 against pressure differences between chambers 73 and 82. Annular spring back members 70, 76 of solid resilient material, for example Teflon, are mounted respectively on surfaces 25 and 72.

The operation is as follows. Assuming the parts have been assembled as shown, the two 3-way valves 88, 90 are positioned as shown, and the pump activated. This establishes high pressure in lines 92, 96 and 81 and high pressure in chambers 27 and 80, maintaining ball 78 shut. Low pressure is established in lines 89, 94, 69, 97. Lines 67 and 83 are always at low pressure. The spring 65 keeps ball 63 shut in the lower valve. As the high pressure builds up, complementary member 30, acting as a piston within a cylinder 60, is moved upwardly, urging bearing washer 51 upwardly against split ring 43 secured to the stud 17, stretching the latter. A suitable instrument is employed to indicate the degree of elongation and the pressure increase is halted when it is achieved. If however, due to malfunction or inattention, the pump is not shut off, then, before the seals 61 are broken due to excessive fluid pressure, the surface 72 strikes the depressor 77 of the second check valve 75. The ball 78 pushed upwardly opens a channel connecting the high pressure oil in chamber 80 to underlying chamber 82, relieving the pressure and allowing the oil to flow back via conduit 83 to the reservoir. When the pump is shut off, member 76 which became compressed pushes piston 30 downward reseating ball 78.

Hydraulic assembly of the members is accomplished as follows. While some clearance is shown at the vertical sides 99 for clarity, in practice the two members would be closely fitted together requiring strong manual pressure to assemble the embodiment of FIG. 2. The embodiment of FIG. 4 can be assembled using fluid pressure. Assuming now the absence of members 51 and 43, the two loosely joined flange bearing member 60 and complementary member 30 are seated on the flange 13. Then to seat the two together establishing the seals at 61 and 74, the two 3-way valves 88 and 90 are rotated 90°, and then the pump is activated. This establishes high pressure in the same lines 94, 69, 97, 93 where low pressure existed in the other condition, except for 67 and 83 which are always at low pressure, and low pressure in lines 92, 96, 95 and 81 where high pressure had previously existed. Thus high pressure now exists in the second chamber 73, and low pressure in chamber 27. The result is to drive the complementary piston member 30 downward until the depressor 62 is actuated by surface 28, relieving the pressure via the open ball 63 and line 67 back to the reservoir 86, which is the desired starting position for piston 30 in preparation for a tensioning operation. Spring back member 70 when compressed serves to restore the position of piston 30 removing pressure on rod 62 and reseating ball 63. It will be evident that other hydraulic systems following the principles outlined above can readily be devised to provide hydraulic assembly of the members and protection against overtravel.

As will be observed from FIGS. 2 and 4, the fluid receiving chamber 27 is located below and laterally offset outwardly from the split ring 43. This results in a turning couple as the fluid pressure increases. To reduce this turning couple, the convex and concave bearing surfaces 50, 53 are given curvatures such that, as shown in FIG. 4, in the zero upward force position, they contact one another only partially at opposed areas closest to the stud 17. As the upward pressure builds up, the slight rotation of piston 30 and bearing washer 51 as well as deformation of the latter that occurs increases the area of contact between the surfaces 50, 53 more remote from the stud 17. This outwardly moving contact by changing the lever arm involved maintains low the piston turning moment, thereby reducing the turning couple and directing most of the applied force vertically upward to elongate the stud. To achieve the foregoing requires that the curvature of the curvex surface 50 be greater than that of the concave surface 53. The manner of achieving this within the principles stated above will be obvious to those skilled in the art. As one example, the convex surface 50 may be spherical with radius $R_1$ and the concave surface may also be spherical with radius $R_2$, where $R_2 = 1.2 R_1$. Both spherical surfaces are centered on the longitudinal axis 49 through the stud 17 (FIG. 2). As another example, convex surface 50 may again be spherical with radius $R_1$, and concave surface 53 may comprise a first spherical segment adjacent the stud also of radius $R_1$ and adjacent thereto a second concave segment of reduced curvature blending smoothly with the first segment and equivalent to a sphere having a radius of $R_3$, where $R_3$ is greater than $R_2$. Other combinations of surfaces will be well within the skill of the designer.

It will also be evident that the tensioners of the present invention can be combined with the various features outlined in my copending application, such as provision of a permanent extensometer device attached to the stud to continuously show the degree of elongation, attachment of suitable optical devices to indicate the degree of bowing of the pressure head during bolt tensioning, and the incorporation of the tensioner in the indexing device described in my prior application, which provides for simultaneous securing of a plurality of bolts, and automatic advancement of plural tensioners to succeeding bolts for the succeeding securing sequence.

While the principles of the invention have now been made clear in several illustrative embodiments, there will be immediately obvious to those skilled in the art many modifications in structure, arrangement proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. A bolt tensioning device for loosening or tightening a nut on a threaded stud used for bolting the head flange to a nuclear reactor pressure vessel, comprising a flange bearing member having means for positioning same on the head flange and surrounding the nut and an internal ledge providing an upwardly facing surface, a complementary piston member seated on the flange bearing member and having a surface opposed to the upwardly facing surface on the latter, said complementary member having an upwardly facing surface, means for removably engaging a threaded portion of the stud, means for removably securing the stud thread engaging means to the stud, said stud thread engaging means having a downwardly facing bearing surface, force transmitting means coupling the upwardly facing surface of the complementary member to the downwardly facing bearing surface of the thread engaging means, means for introducing pressurized fluid between the upwardly facing surface of the flange bearing member and the opposing surface on the complementary member, said flange bearing member having a portion extending over the complementary member, first valve means in the flange bearing portion and adapted to be actuated when the complementary member elevation exceeds a predetermined amount, and means responsive to the actuated first valve means for relieving high fluid pressure between the flange bearing and complementary members.

2. A bolt tensioning device as set forth in claim 1 wherein the force transmitting means comprises a bearing washer disposed entirely between the complementary member upwardly facing surface and the stud thread engaging means downwardly facing bearing surface.

3. A device as set forth in claim 2 wherein the stud thread engaging means downwardly facing bearing surface is convex, and the opposed surface of the bearing washer is concave, the convex surface curvature being greater than that of the concave surface.

4. A device as set forth in claim 1 wherein the flange bearing member comprises a generally annular body having an inward annular ledge providing the upwardly facing surface, the complementary member comprises a main body portion seated on the said ledge and a depending skirt portion, the complementary member opposed surface and the ledge surface defining the fluid receiving annular chamber located below the stud thread engaging means, annular seal means sealing off the annular chamber, and means in the flange bearing member for introducing pressurized fluid into the annular chamber.

5. A device as set forth in claim 4 wherein the annular chamber is laterally offset outwardly of the stud thread engaging means, and the force transmitting member comprises a spherical bearing surface for transmitting the upward force.

6. A bolt tensioning device adapted for loosening or tightening a nut on a threaded stud used for bolting the head flange to a nuclear reactor pressure vessel, comprising means for removably engaging the stud threads above the nut, hydraulic means for imparting an upward force to the stud engaging means, said hydraulic means comprising mating parts forming a hydraulic piston and cylinder assembly, means coupling one of the mating parts to the stud-engaging means, said mating parts tending to separate when imparting the said upward force, and means forming an auxiliary hydraulic chamber for assembling the mating parts upon the introduction of pressurized fluid into the auxiliary chamber, said auxiliary chamber being located above the said one mating part and driving same downward toward the other of the mating parts upon introduction of pressurized fluid.

7. A device as set forth in claim 6 wherein the stud thread engaging means comprises a split sleeve with an inside thread matching that of the stud.

8. A device as set forth in claim 7 wherein the securing means comprises a sleeve adapted to fit over the split sleeve, said securing means and split sleeve being provided with complementary tapered smooth contacting surfaces.

9. A device as set forth in claim 8 wherein the securing means sleeve has an aperture at its top for receiving a wedge shaped element which when inserted will impart to it an upward force relative to the stud for removing the sleeve.

10. A bolt tensioning device as claimed in claim 6 wherein means are provided responsive to movement of the hydraulic piston to interrupt introduction of pressurized fluid.

11. A device as set forth in claim 1 and comprising second valve means in the flange bearing member and adapted to be actuated when the complementary member is moved downward toward the flange bearing member, means providing a pressurized fluid receiving chamber located between a top surface of the complementary member and the flange bearing portion overlying same, means for introducing pressurized fluid into the last-named chamber for driving the complementary member downward, and means responsive to actuation of the second valve for relieving high fluid pressure in said chamber.

12. A bolt tensioning device as claimed in claim 1 and further including means for hydraulically assembling the complementary member.

* * * * *